United States Patent [19]

Smith

[11] Patent Number: 5,117,511

[45] Date of Patent: Jun. 2, 1992

[54] LIQUID DISPOSAL AUTOMOTIVE ACCESSORY

[76] Inventor: Anthony Smith, 2316 S. Union St., St. Petersburg, Fla. 33712

[21] Appl. No.: 465,839

[22] Filed: Jan. 16, 1990

[51] Int. Cl.⁵ .................. B60R 15/04; A61J 19/04
[52] U.S. Cl. .......................................... 4/114.1; 4/262
[58] Field of Search ............. 4/114.1, 262, 266, 258, 4/301; 296/37.11

[56] References Cited

U.S. PATENT DOCUMENTS

| | | | |
|---|---|---|---|
| 1,046,911 | 12/1912 | Walker | 4/262 |
| 1,058,564 | 4/1913 | Dorsey | 4/262 |
| 1,231,385 | 6/1917 | Korten | 4/262 |
| 1,721,832 | 7/1929 | Porter | 4/114.1 |
| 1,727,199 | 9/1929 | Freitag | 4/114.1 |
| 1,749,104 | 3/1930 | Kovacs | 4/114.1 |
| 1,826,137 | 10/1931 | Kushner | 4/262 |
| 1,905,881 | 4/1933 | Avila | 4/114.1 X |
| 2,754,145 | 7/1956 | Mackey | 4/262 X |
| 4,165,546 | 8/1979 | Philipson et al. | 4/262 |
| 4,785,483 | 11/1988 | Wise | 4/114.1 X |

Primary Examiner—Henry J. Recla
Assistant Examiner—Robert M. Fetsuga
Attorney, Agent, or Firm—Charles A. McClure

[57] ABSTRACT

Liquid disposal accessory means and method for motor vehicles. Undesired liquid or fine particulates, preferably in fluidized form, are disposed from the driver and/or passenger compartment through a funnel with a drain tube to the exterior or a collection location. The funnel is withdrawn manually to a use position from a dashboard or console rest position—to which it normally retracts. Rinsewater is pumped into the funnel from a nearby interior source upon demand.

10 Claims, 2 Drawing Sheets

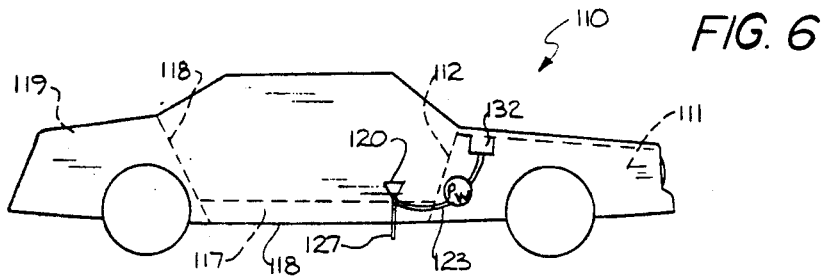
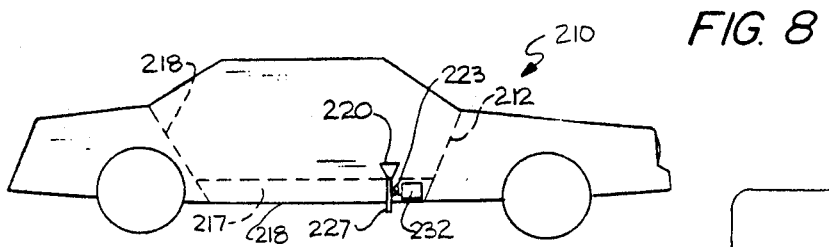
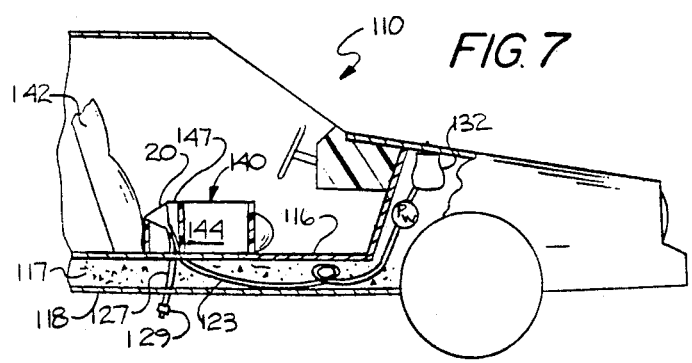
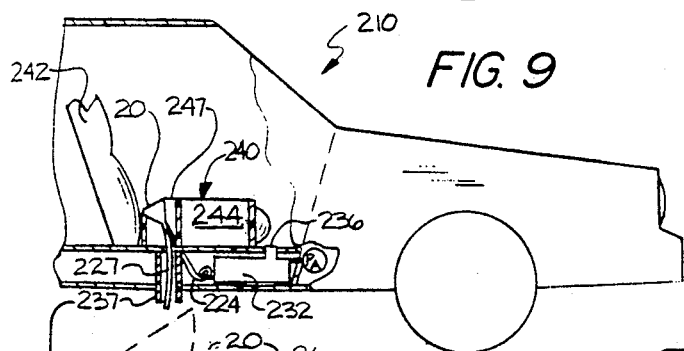
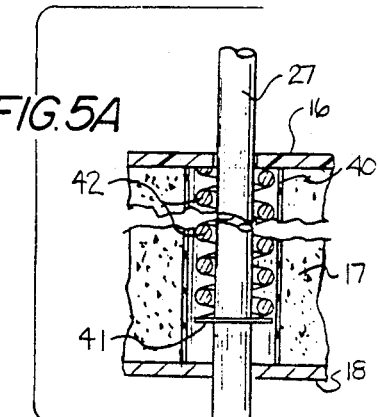
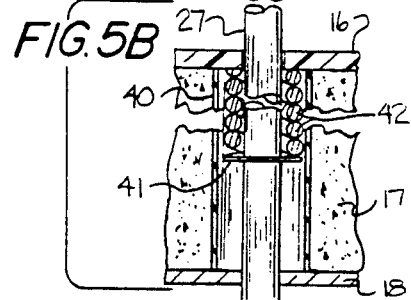
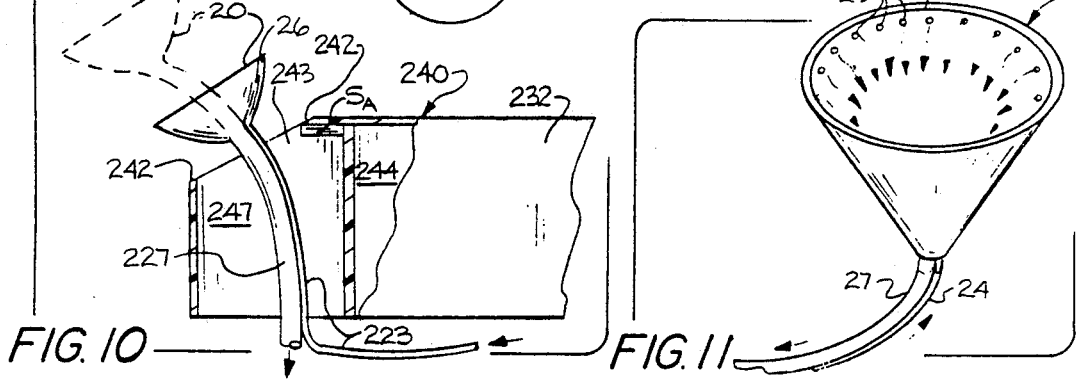

LIQUID DISPOSAL AUTOMOTIVE ACCESSORY

TECHNICAL FIELD

This invention relates to disposal of undesired liquid or fine particulates (preferably in fluidized form) from the driver and/or passenger compartment of an automotive vehicle, and concerns in particular novel accessory systems for facilitating such disposal.

BACKGROUND OF THE INVENTION

The expression "spitting into the wind" probably means little literally to most people nowadays, at least until they attempt to dispose of any excess liquid out an open window of a rapidly moving vehicle—when they are likely to speculate that there must be a better way. Yet the occasion does arise when one has to spit somewhere or to dispose of fluidized or fluidizable grains of sand or tobacco, for example. Then a repository inside a vehicle has even less appeal, if possible, than a barbershop spittoon. Deferring an effective solution to the existing problem not only postpones disposal but may culminate in a less tractable pollution situation.

When dentists render spitting desirable or necessary, as by inserting dental materials—or their hands—into people's mouths, they also conveniently furnish liquid disposal facilities, as in Albigese U.S. Pat. No. 3,066,318. Although long trips by car lack a comparable stimulus, they are also confining, and riders may wish to spit, or to pour out the dregs of a soft drink, or even to rid their shoes of beach sand. Carmakers do not yet take notice of such exigencies, even though it is safe to say that every rider has experienced them.

SUMMARY OF THE INVENTION

A primary object of the present invention is to facilitate the disposal of undesired liquid, in relatively minor amount, from the driver/passenger compartment of a motor vehicle.

Another object is to enable riders in motor vehicles to dispose of fluidized particulates readily and neatly to the exterior, A further object is to provide automotive accessory equipment adapted to accomplish the foregoing objects.

Yet another object is to provide such accessory equipment with fluidizing or flushing capability.

A still further object is to accomplish the various foregoing objects in an economical, effective, and convenient manner.

Other objects of the present invention, together with means and methods for attaining the various objects, will be apparent from the following description and accompanying diagrams of preferred embodiments, which are presented by way of example rather than limitation.

SUMMARY OF THE DRAWINGS

FIGS. 5A and 5B are sequential side sectional elevations of the outlet region of FIG. 4, with added biasing means; and FIG. 6 is a fragmentary sectional elevation of an automotive vehicle with floor-mounted accessory apparatus of this invention.

FIG. 7 is a partial cutaway view, on a larger scale, showing such accessory apparatus of FIG. 6 in more detail;

FIG. 8 is a fragmentary sectional elevation of an automotive vehicle with a modified embodiment of such floor-mounted accessory apparatus;

FIG. 9, is a partial cutaway view, on a larger scale, showing such accessory apparatus of FIG. 8 in more detail;

FIG. 10 is a fragmentary sectional elevation of part of such floor-mounted accessory apparatus on an enlarged scale; and FIG. 11 is a perspective view of the funnel of prior views, on an enlarged scale.

DESCRIPTION OF THE INVENTION

Figure 1:
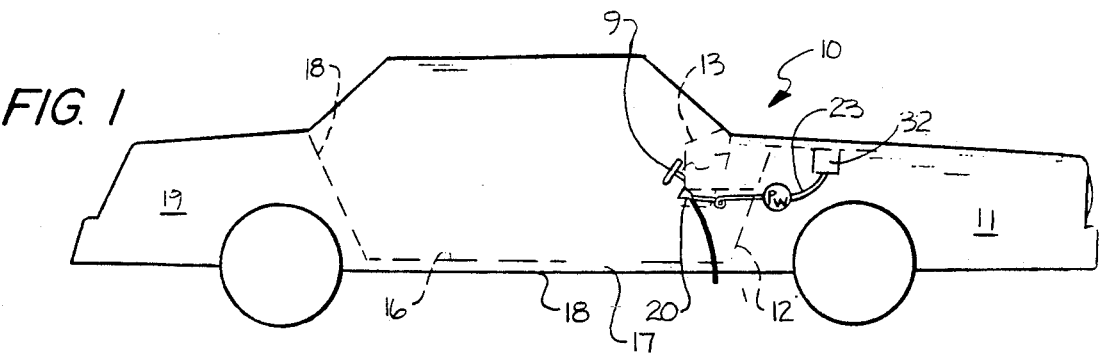
FIG. 1 is a fragmentary side elevation of an automobile featuring a dash-mounted accessory apparatus embodiment of this invention.

FIG. 1 shows automobile 10 in fragmentary side elevation. Front (or "fire") wall 12 and back wall 18 (both indicated in broken lines) schematically subdivide the vehicle interior into a forward engine compartment 11, an intermediate driver/passenger compartment 15, and an aft storage compartment 19. Subfloor compartment 17 lies underneath the driver/passenger compartment, between floor 16 and bottom 18 of the vehicle. The driver's compartment shows steering column 7 and wheel 9 and the outline of dashboard (or "dash") 13.

Accessory apparatus of the present invention, shown in FIG. 1 as if seen with x-ray vision, features funnel 20 having two connecting tubes. Water-supply tubing 23 originates at the lower part of rinsewater bottle 32 supported on firewall 12 in engine compartment 11, continues to and past water pump $P_W$, down the firewall and into the subfloor compartment, terminating at the funnel wall, under dash 13. The water-supply tubing ends at the funnel wall, at or near which it adjoins drain tubing 27, which extends from the funnel to and through compartment floor 16 and vehicle bottom 18—from which such drain tube (partly cut away) protrudes appreciably.

Figure 2:
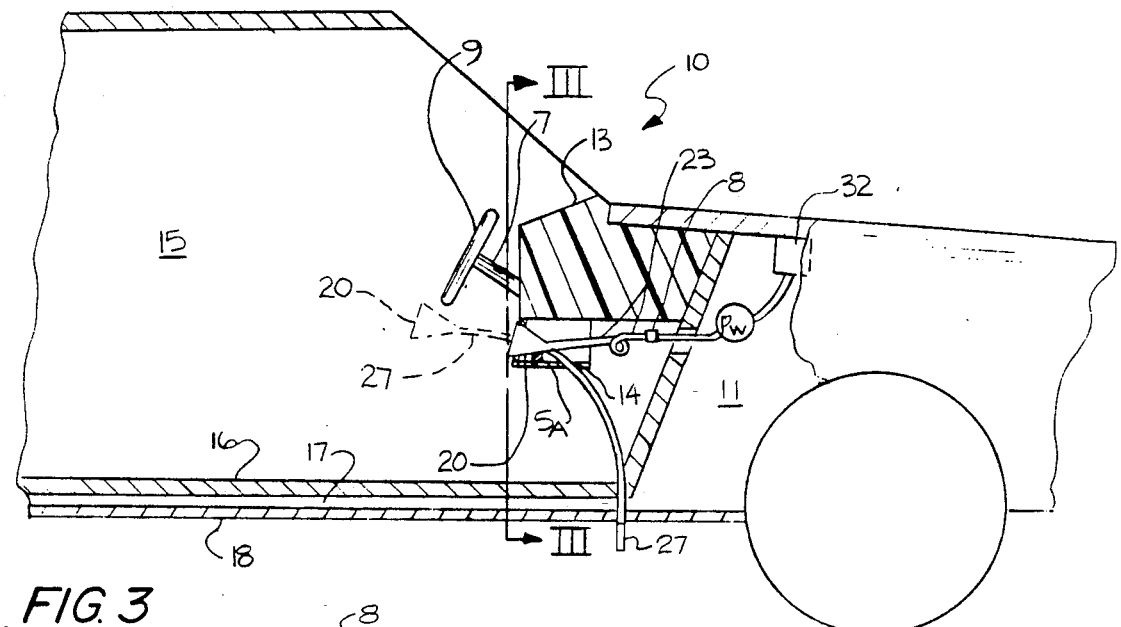
FIG. 2 is a similar view, on a larger scale, showing details of the embodiment of FIG. 1.

FIG. 2 shows fragmentarily the right central portion of FIG. 1, on an enlarged scale, and still omitting the usual seats as superfluous to the showing of the invention. Funnel 20 and drain tube 27 appear in normal rest position partly surrounded by partial housing 14 secured underneath dash 13, also in an extended position (shown in dashed lines). Water-supply tubing is shown in two parts joined end-to-end by connector 8. As before, the drain tube is shown broken away below the bottom of the automobile and may be appreciable longer than shown. Inside the housing, under the funnel in its rest position, is automatic switch $S_A$ for the water pump.

Figure 3:
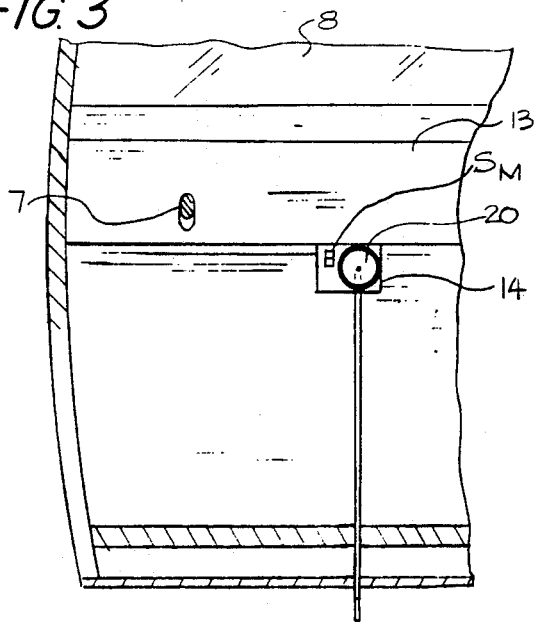
FIG. 3 is a fragmentary front elevation of the dashboard and below, from the preceding views, taken at III—III on FIG. 2.

FIG. 3 shows part of the driver's compartment 15 viewed forward toward the dash, as from the driver's position, and showing part of windshield 8. Funnel 20 is visible at the front of small housing 14, which is secured underneath dash 13 to the right of—and at a lower level than—steering column 7. Manual switch $S_M$ for the water pump $P_W$ (not shown in this view) is mounted on the housing alongside the funnel. Although near the driver's position, the funnel and the switch are situated within ready reach of a front-seat passenger.

Figure 4:
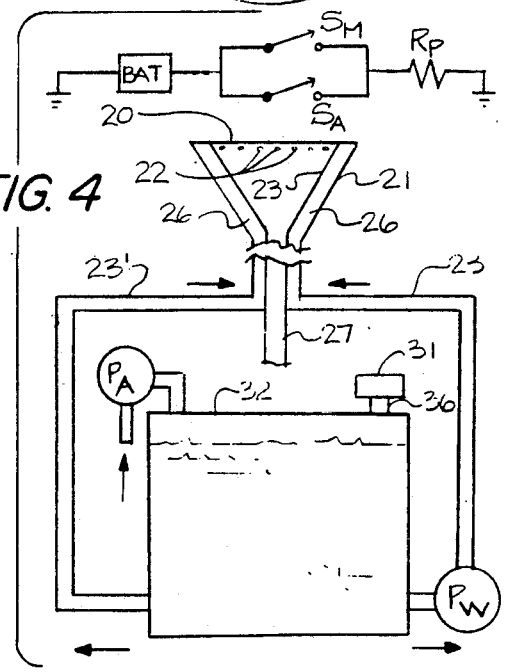
FIG. 4, is a schematic diagram of relationships between electrical and mechanical, parts of the embodiment of the preceding views.

FIG. 4 shows schematically electrical, fluid, and mechanical features of the components of the preceding views, including motor winding $R_P$ connected between battery BAT and ground. Automatic and manual Switches $S_A$ and $S_M$ are connected in parallel between the battery and the motor winding. Below such electrical schematic part of this view is funnel 20 with drain tubing 27, shown partly cut away. Water flow space 26, between outer wall 21 and inner wall 23 of the funnel, is fed from tube 23 connected to rinsewater container 32 as an outlet tube and as an inlet tube to the funnel itself.

FIG. 4 is a composite, in that it also shows alternative (or supplementary) tube 23' connected to the rinsewater container near its bottom. Whereas water pump $P_W$ is interposed in tube 23, just described, airpump $P_A$ is mounted on the rinsewater container in position to draw air in from the exterior and thereby to compress the air inside the container, which otherwise is sealed off by cap 31 on filler tube 36. The air pressure inside forces rinsewater out from the container via tube 23' and into the funnel via the flow space between its double wall (as from tube 23 with the water pump).

Operation of the apparatus of this invention will be readily understood from the foregoing drawings. Vehicle (or auxiliary) battery B energizes pump motor resistance winding $R_P$ when either manual switch $S_m$ or automatic switch $S_A$ is actuated to complete the electrical circuit in the motor of whichever pump is being used (possibly both). The manual switch is actuated directly by hand, of course, and the automatic switch is actuated indirectly by manual withdrawal of the funnel from its rest position to an extended use position. Either way rinsewater is pumped to the funnel. The supplied rinsewater flows into the space between the funnel walls, exits through the ring of openings near the tope edge of the inside wall, and flows down through the funnel and out from its neck into, through, and out the drain tube when the funnel is in use or is being rinsed preliminary to or following use.

When the driver or a passenger wishes, he or she withdraws the funnel from its rest position. Withdrawal of the funnel from contact with the automatic switch triggers the switch to actuate the pump, whereupon water flows from the openings near the rim down the exposed inside wall of the funnel. Such water rinses away, down and out the drain tube, surplus liquid (such as saliva), or even finely divided particulate matter (such as sand or tobacco grains) fed into the funnel gradually enough so as not to block or overflow it. When finished using the funnel, the user returns it to its rest position, thereby switching off the Water flow, unless continued flow is required to clear the drain tube, in which event the manual switch can be switched on for a suitable period. In order to avoid excessive use of water, as by the user forgetting that the manual switch is on, it can have a built-in timer to switch it off in a minute or so.

It will be understood that withdrawing the funnel from its rest position extends the drain tube, raising its bottom end, and that returning the funnel to its rest position lowers the drain tube end. The drain tube is sufficiently flexible to conform to a desired configuration but is not overly flexible so as to buckle or bind in the confined openings through which its lower end portion has to move.

Gravity aids in establishing a rest position of the drain tube, but supplementary assistance is available as in FIGS. 5A and 5B, which show fragmentarily on an enlarged scale drain tube 27 and associated components in the vicinity of the bottom end of the tube. Shading of the collar is for metal, whereas shading of the material outside the collar is for plastic granules or like insulation for sound-deadening or related purposes. Tubular collar 40 extends from the lower surface of vehicle floor 1 through subfloor compartment 17 and bottom 18, with which its lower end is about flush. Helical spring 42 surrounds the drain tube with the lower spring end held by circular clip 41 around the part of it at about floor level when the funnel at the top end of the drain tube is in rest position.

FIG. 5A shows the drain tube slightly retracted just above its normal unextended or rest position, as is apparent from the location of retainer clip 41 just spaced above subfloor bottom wall 18. Part of the drain tube and the surrounding spring are cut away here. FIG. 5B shows the drain tube at its maximum withdrawal or extension and the maximum compression of the spring, at which point the bottom end of the drain tube is just below the bottom of the vehicle.

FIGS. 6 and 7 show another embodiment (110) of the invention in views analogous to FIGS. 1 and 2; FIGS. 8 and 9 show yet another embodiment (210) in analogous fashion, and FIG. 10 shows the latter embodiment even further. In both of these additional embodiments the funnel is relocated from a position underneath the dash in front of the driver and/or passenger(s) to between the driver and passenger positions, in a console located nearer the floor.

In FIGS. 6 through 9, except for funnel 20 (which is unchanged) and its parts, the same or analogous features are identified by similar reference numerals, plus 100 for the embodiment of FIGS. 6 and 7; and plus 200 for the embodiment of FIGS. 8 through 10. This facilitates understanding of the respective embodiments and also simplifies the description by eliminating or reducing otherwise redundant references to similar features of successive embodiments. The pump reference $P_W$ is retained where a water pump is specified.

In FIGS. 6 and 7, the rinsewater container (here 132) remains in the engine compartment along with water pump $P_W$ and much of the attached tubing (here 123), as in the preceding embodiment, but the funnel is relocated in console housing 140 secured to floor 116, and is cocked slightly rearward at a rest position in a housing opening.

Subfloor compartment 117, shown in FIG. 7 as containing sound-deadening granules or similar material, is traversed by drain tube 127 via suitable openings therein. The drain tube is shown here as having collar stop 129 about its lower end to preclude it from being raised above the bottom of the vehicle—and possibly discharging rinsewater into the subfloor compartment or even into the driver-passenger compartment. Tubing 123 reaches the funnel through the subfloor compartment.

FIG. 8 is similar to FIG. 6, and FIG. 9 similar to FIG. 7, except for modification in design and location of corresponding accessory components. Pressurizable container 232 is located in subfloor compartment 217) greatly reducing the length of rinsewater tube 223. As shown later, the previous water pump means is replaced by airpump means, to compress air against the rinsewater so as to propel it. Console 240 is mounted between front seats (not shown) as customary in many automobiles today. For simplicity, no showing is made of features in the main (forward) part of the console. Funnel 20 is seen in its rest position at the upper rear corner (oblique) of the console. Also visible in FIG. 9 is sleeve 237 surrounding drain tube 227 from the floor to and through the bottom of the vehicle, sealing off subfloor compartment where it is traversed by the drain tube. No collar stop is shown around the bottom end of the drain tube here although one could be used, of course. Pressurizable container 232 has filler tube 236 at its forward end clear of the front end of the console so as to be readily available (cap omitted here).

FIG. 10 shows the latter apparatus embodiment fragmentarily in the vicinity of the oblique upper rear corner of console 240. Funnel 20 seats along the outside surface of its rim 22 against the surrounding edge 242 of console opening 243, and switch 245 is mounted (as $S_A$) just under the horizontal part of that edge so as to be actuated when the funnel is raised from (as shown here in broken lines) or returned to (solid lines) its rest position. Such switch actuates appropriate airpump means here, but as shown in FIG. 4 also could be used to actuate water pump means of previous embodiments. Both inlet and drain tubings 223 and 227 may be joined side-to-side for the part of their length normally within the aft compartment of the console. It is apparent that the funnel has a double wall and that small tubing 223 communicates with space 26 therebetween.

FIG. 11 shows the funnel in perspective from above and with combined tubing of the last embodiment. Arrows suggest the flow of water supplied from tubing 223 to the funnel interwall space out through such outlets and down the funnel toward drain tubing 227.

The mentioned apparatus components are commonly available, and no special materials are needed for the practice of this invention. The tubing may be obtained in almost any desired size in rubber or any of many synthetic polymers, such as nylon, polyvinyl chloride, polyethylene, and polypropylene, for example. The funnel may be of similar composition or may be made of glass or of a thermosetting phenol-formaldehyde or urea-formaldehyde resin, for example.

The rinsewater supply tubing is enough longer than the shortest distance from the rinsewater container to the funnel so as to enable the funnel to be withdrawn from its rest position for use. Normally it is anticipated that the funnel will be withdrawn only about a foot or so. Such extra length in the tubing is suggested by slack or a break in the depicted tubing length in the various views. The rush of water pressure into the tubing when the funnel is withdrawn is helpful in precluding kinking, but surrounding helical wire winding or other usual anti-kinking precautions may be provided.

The drain tubing is also longer by about an equal amount. As noted, when the drain tubing protrudes from underneath the vehicle, either a stop is affixed to it, whether at its exit end or at an intermediate location, to prevent it from being pulled inside; or, alternatively, a drain collar surrounds the tubing for much of its lower length so that it may be withdrawn to a desired distance without anything more untoward occurring than occasional spilling of some water inside. The drain end can readily be manually reinserted into the drain collar in the event of such inadvertent removal. An alternative (not shown) would be to configure an intermediate length of the drain tubing as a retractable helix, so that it would stretch and retract while always sloping downward for gravity through it.

If a mischievous child is likely to play with the funnel, so as to start the liquid flow when on automatic, a manually actuatable deactivation switch can be inserted into the circuit, or the existing switch can be provided with a manual lockout to be set whenever the child is present. If desired, actuation of the ignition switch may be prerequisite to energization of the apparatus of this invention, much as is true of windshield wipers, by similarly connecting the funnel-actuated (or equivalent) switch.

The apparatus of this invention may be installed by automobile manufacturers as original equipment, or (perhaps more likely) can be supplied in kit form to the after-market for installation by dealers or customizers or other members of the public. Retrofitting installation requires only the drilling of a few holes and securing of the several components in the desired locations. Kits may include a console, or a funnel mount as an add-on to a pre-installed console. In the event that alternative disposition of liquid from the funnel is desired, the liquid is readily vaporized by redirecting the drain tubing into the vicinity of a suitably convenient and effective hot place, such as the tailpipe—preferably downstream from the muffler and all environmental equipment—as with additional special kits.

It will be understood that if exterior disposal of such liquids is prohibited, or is otherwise undesired, an interim collection site can be provided in the interior, within the subfloor compartment, or attached to the outside below the subfloor compartment. Such add-on need not alter the structure or operation of the embodiments already illustrated and described because only supplementary thereto.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

THE CLAIMED INVENTION:

1. In an automotive vehicle with a plurality of interior compartments, including a driver/passenger compartment, the improvement comprising
    manually withdrawable and retractable funnel means located adjacent the floor of the driver/passenger compartment and having an inlet end at a given level and a lower outlet end,
    rinsing means for supplying liquid to the funnel means inlet end, the rising means including a container of rinse liquid, means adapted to pump such rinse liquid, and tubing for conducting pumped rinse liquid to the funnel means, for draining liquid from the funnel means outlet end, and
    spring-actuated retraction means attached to the drain means and adapted to maintain the funnel means in a retracted position when released from a withdrawn position.

2. Automotive vehicle according to claim 1, wherein the inlet end of the funnel means has openings therein and is jacketed with an outer wall surrounding an inner wall and connected to the rinse liquid tubing.

3. Automotive vehicle according to claim 1, wherein the vehicle has a drain opening to the vehicle exterior, and the exit means comprises a drain tubing having an inlet end interconnected to the outlet end of the funnel means and having an outlet end extending through the drain opening, and means for retaining the drain tubing outlet end through the drain opening.

4. Automotive vehicle driver/passenger compartment accessory, comprising manually withdrawable and retractable funnel means, normally retracted to a rest position, having an inlet end adapted to be rinsed with rinse liquid, and a lower outlet end connected to an exterior drain, drain means interconnecting the funnel means outlet to the drain, and including spring-actuated retraction means attached to the drain means and adapted to maintain the funnel means in a retracted position when released from a withdrawn position, rinsing means adapted to supply rinse liquid to the funnel means, including a rinse liquid supply container, tubing conducting rinse liquid from the supply container to the funnel means, and pump means adapted to pump such rinse liquid through such tubing.

5. Automotive vehicle driver/passenger compartment accessory, comprising manually withdrawable and retractable funnel means, normally retracted to a rest position, having an inlet end rinsed with rinse liquid, and a lower outlet end connected by drain tubing to an exterior drain;

spring-actuated funnel retraction means attached to the drain tubing and adapted to maintain the funnel means in its retracted position when not positively manually withdrawn therefrom;

rinsing means adapted to supply rinse liquid to the funnel means, including a rinse liquid supply container, tubing conducting rinse liquid from the supply container to the funnel means, and motor-driven pump means adapted to pump such rinse liquid through such tubing; and actuating switch means for the pump motor actuatable by withdrawal of the funnel means from its rest position and actuatable also by a separate manual switch.

6. Automotive vehicle driver/passenger compartment accessory, comprising manually withdrawable and retractable funnel means, normally retracted to a rest position, having an inlet end rinsed with rinse liquid, and a lower outlet end connected to an exterior drain;

wherein an accessory console housing supports the funnel means and covers rinsing means adapted to supply rinse liquid to the funnel means, including a rinse liquid supply container, tubing conducting rinse liquid from the supply container to the funnel means, and pump means adapted to pump such rinse liquid through such tubing.

7. Automotive vehicle accessory according to claim 6, wherein the pump means is motor-driven, and the console includes actuating switch means for the pump motor actuatable by withdrawal of the funnel means from its retracted position or by separate manual switching.

8. In an automotive vehicle having console means located in a driver/passenger compartment, between the seats an improved console means comprising a housing with upper and lower openings therein, the lower opening communicating with a drain opening in the vehicle body, funnel means with an inlet end and an outlet end,
the inlet end normally resting within and protruding from the upper opening, from which the funnel means is manually withdrawable and to which the funnel means is retractable, the outlet end being interconnected by a drain tube to a lower drain opening, the drain tube extending through the lower opening of the housing to the exterior of the vehicle; and retracting means normally retaining the funnel means in its retracted rest position.

9. Automotive vehicle with console means according to claim 8, wherein the retraction means includes a helical compression spring with upstream and downstream ends surrounding part of the drain tube, the upstream end of the spring being attached to an adjacent fixed part of the vehicle, and the upstream end of the spring being attached to the drain tube, whereupon manual withdrawal of the funnel means from its rest position compresses the spring, and upon manual release of the funnel means the compressed spring expands and returns the funnel means to its rest position.

10. Automotive vehicle with console means according to claim 9, including means adapted to pump rinse water to the funnel means from a container thereof interconnected to the inlet end of the funnel means upon actuation of connected fluid pump means.

* * * * *